US005318624A

United States Patent [19]

[11] Patent Number: 5,318,624

[45] Date of Patent: Jun. 7, 1994

Corbin

[54] PROCESS FOR PREPARING A DISPERSION FROM AN AGGLOMERATED MIXTURE

[75] Inventor: Douglas D. Corbin, Rochester, N.Y.

[73] Assignee: Eastman Kodak Company, Rochester, N.Y.

[21] Appl. No.: 940,461

[22] Filed: Sep. 4, 1992

[51] Int. Cl.[5] .......... C09C 1/36; C09C 3/04

[52] U.S. Cl. .......... 106/447; 427/411; 106/401; 106/400

[58] Field of Search .......... 427/411; 106/447

[56] References Cited

U.S. PATENT DOCUMENTS

| | | | |
|---|---|---|---|
| 4,004,939 | 1/1977 | O'Brien et al. | 106/135 |
| 4,115,435 | 9/1978 | O'Brien et al. | 558/437 |
| 4,582,785 | 4/1986 | Woodward et al. | 430/538 |
| 4,868,087 | 9/1989 | Yamamoto | 430/138 |
| 4,935,298 | 6/1990 | Dethlefs et al. | 428/323 |
| 4,963,604 | 10/1990 | Coco et al. | 427/411 |
| 5,026,782 | 6/1991 | Biale | 427/411 |
| 5,131,951 | 7/1992 | Yoshida et al. | 427/411 |

*Primary Examiner*—Mark L. Bell
*Assistant Examiner*—Scott L. Hertzog
*Attorney, Agent, or Firm*—Paul A. Leipold

[57] ABSTRACT

A process for preparing a uniform aqueous dispersion of titanium dioxide, gelatin, polymer beads and other components of a reflective binder layer for a photographic paper is disclosed. The process comprises combining all the components without regard to the creation of aggregates and then passing the entire mixture through a media mill to form a uniform dispersion.

6 Claims, 1 Drawing Sheet

PROCESS FOR PREPARING A DISPERSION FROM AN AGGLOMERATED MIXTURE

BACKGROUND OF THE INVENTION

1. Field of the Invention

The invention relates to an improved process for preparing a uniform dispersion of titanium dioxide for forming a reflective layer for photographic paper.

2. Information Disclosure

Photographic base paper is used as an image-receiving base for prints produced by a number of different photographic processing systems, including chemical transfer offset, instant photography, and, in particular, the conventional negative-positive process system. The resulting print essentially consists of coated base paper and an image-containing layer which is adhered to the base. In the negative-positive process where the image-containing layer is referred to as the emulsion coating, a binder is usually employed under the emulsion coating to effect its adhesion to the base. Conventionally gelatin is used as the binder although alternative synthetic materials are used. A white pigment is generally incorporated in the gelatin. It is known that the sharpness of a photographic image depends on the extent of reflection of the impinging light off the white pigment. Therefore, it is an important object of all reflective binders to improve the reflection of the impinging light. This is achieved by employing white pigments with the highest indices of refraction, such as titanium dioxide, and by maintaining as high as possible a content of pigment in the gelatin. A very good dispersion generates a dense pigment packing in the support near the surface. Pigment agglomerates must not be generated in the gel, since they decrease the total light reflection, and they can result in disturbances and interferences during the casting of the coated support with light-sensitive emulsions.

In addition to titanium dioxide, the reflective binder layer, or "white pad" usually contains surfactants or dispersants, optical brighteners, and a very small amount of cyan dye to correct the whiteness of the $TiO_2$. The formulation also includes an emulsion of polymer beads to provide improved surface texture, and may include antiseptics to retard the growth of micro-organisms in the gel.

Conventional processes for the preparation of uniform fine particle dispersions of titanium dioxide in gelatin are time consuming and subject to periodic losses. The dispersions are made in three steps and all three steps must be executed with very tight tolerances. Dry titanium dioxide is wetted with water and two surfactants at a concentration of about 70%. The slurry is then run through a media mill and stored until the next step in the process is ready. In a second step in a large temperature-controlled vessel, the titanium dioxide slurry, distilled water, optical brighteners, polymeric bead emulsion, and a very small amount of a cyan dye are mixed for at least sixty minutes and heated to 40° C. In a separate, large vessel a 12% solution of gelatin in water is prepared at 40° C. The pH of the gelatin solution is matched to the pH of the titanium dioxide slurry and the two are mixed together. The mixing and rate of addition must be controlled properly to avoid the formation of foam and to avoid the formation of agglomerates. If agglomerates form, the dispersion must be filtered to remove them or if there are too many agglomerates, the dispersion must be discarded. Thus, there are several shortcomings with the process of the art: (1) three large temperature-control vessels are required, (2) if agglomerates are formed there are no corrective measures that can be taken to save the dispersion, and (3) the process is a three-step process.

There is thus a need for a single-step process which could be carried out in one vessel and which would avoid the problem of agglomerates in the final dispersion.

Known processes for making a reflective binder or "white pad" have employed a media mill to grind the solid component, $TiO_2$, to produce fine particles, and then have combined the finely divided $TiO_2$ with the liquid components to form the suspension for the white pad. It has now been surprisingly found that the entire formulation, containing both solids and liquid and including agglomerates, can be converted to a uniform dispersion by media milling. This is particularly unexpected because the agglomerates, which inevitably form when the ingredients are simply dumped together, contain not just titanium dioxide, which is known to be grindable, but also gelatin. Moreover, the volume of material passing through the media mill is greatly increased and the solids content is significantly diminished.

SUMMARY OF THE INVENTION

It is an object of the invention to provide a single step process for preparing a uniform dispersion of titanium dioxide in gelatin.

It is a further object of the invention to provide a process that requires a single mixing vessel and a media mill for preparing a uniform dispersion of titanium dioxide in gelatin.

It is a further object of the invention to provide a process that reduces the waste of dispersion that is brought about by the formation of unfilterable agglomerates.

It is a further object to provide a process that provides a uniform dispersion in less time.

In one aspect the invention relates to a method for forming a dispersion for a titanium dioxide-based reflective binder comprising mixing water, titanium dioxide, gelatin and polymer beads to form an agglomerated mixture and passing the mixture through a media mill to form a uniform dispersion. The method may additionally comprise mixing dyes, optical brighteners, antiseptics and surfactants. The preferred polymer beads are acrylic polymer beads and the preferred surfactants are anionic surfactants.

In another aspect the invention relates to a process for preparing a dispersion for a titanium dioxide based reflective binder comprising adding together dry titanium dioxide, dry gelatin, water, aqueous anionic surfactant solution, acrylic emulsion, an emulsion of the cyan dye, and an emulsion of an optical brightener to form a mixture and passing the mixture through a media mill to produce a homogenous dispersion.

In another aspect the invention relates to a method for forming a reflective layer for a color photographic paper comprising:

(a) forming an agglomerated mixture comprising titanium dioxide, gelatin and polymer beads;

(b) passing the agglomerated mixture through a media mill to form a uniform dispersion; and (c) laying down a layer of the uniform dispersion on a base paper.

DESCRIPTION OF PREFERRED EMBODIMENTS

Figure 1:
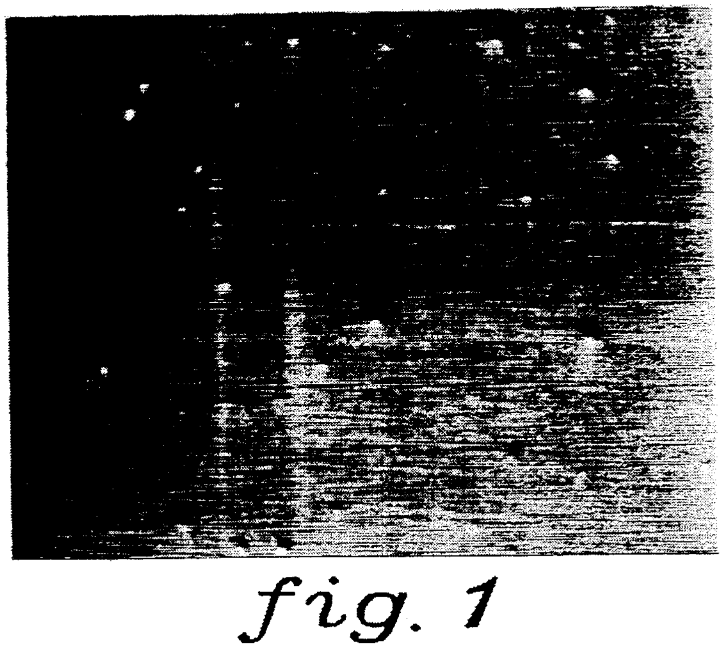
FIG. 1 is a photograph of a dispersion containing agglomerates of titanium dioxide.

According to the invention, one vessel and one media mill are used. All the ingredients are added together in the vessel with only moderate care, mixed, heated to 40° C., and passed through a media mill. The vessel is conventional. Media mills are described in T. C. Patton *Paint Flow and Pigment Dispersion* John Wiley & Sons N.Y. 1979 p. 444–463 which is incorporated herein by reference. The basic features of media mills are: (1) a chamber; (2) a series of flat disk impellers within the chamber; (3) a solid particulate grinding medium, such as sand, glass or ceramic beads or metal shot, and (4) a means for rotating the impellers at high speed 1000–3000 rpm (peripheral velocity about 800M/min.). Media milling can be thought of as an extension of the ball mill principle wherein use is made of tiny balls, beads, or shot. Since the largest beads that are used in sand or bead mills closely approach the dimensions of the smallest balls used in ball mills, there is really no sharp differentiation between bead and ball mills in the region where the two tend to overlap. The Ottawa sand that is commonly specified for sand mills is a 20- to 30-mesh grade corresponding to a particle diameter of about 0.7 mm. Synthetic bead media for bead mills are normally supplied in a range from 0.7 to 3.0 mm. Some mills are designed to operate with media diameters over a wide range and may be considered as either bead or ball mills, depending on the size of the media used in the grinding operation.

Basically media milling consists in pumping the agglomerated mixture (the mill base) through a cylindrical bank of sand or beads which is being subjected to intense agitation. During passage through the agitated zone, the mill base is caught and ground between the media particles with a strong shearing action. On emerging from the active zone, the dispersed mill base overflows through a screen of a mesh size that permits free flowthrough of the dispersion while holding back the media particles.

The agitation of the media particles is produced by flat disk impellers which revolve at high rates of speed (peripheral velocities on the order of 800M/min) within the chamber. Media particles and mill base adjacent to the impeller surfaces pick up the impeller motion through viscous resistance and as a result are slung outward against the confining walls of the grinder. An approximate flow pattern for the overall turbulent flow that ensues may be grossly described as a rolling double-doughnut motion which provides an excellent dispersing effect, especially in the regions adjacent to the impeller surfaces and between the outside edges of the impeller and the container walls.

If the impeller peripheral velocity is 800M/min and the impeller radius is 10 cm, then the centrifugal force acting on the media particle is equal to 104 times its own weight. It is this forceful action on the media particle which compensates for the latter's small size and leads to the generation of strong shearing forces within the mass.

A satisfactory media mill for use in the process of the invention is available from Netzsch-Molinex (Exton, Pa.).

Figure 2:
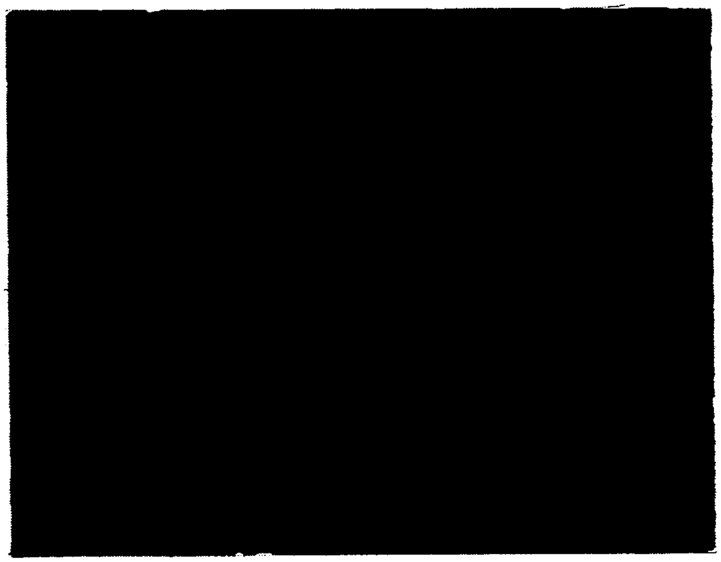
FIG. 2 is a photograph of a dispersion according to the invention.

As discussed above, a typical white pad dispersion is composed of (1) gelatin, (2) $TiO_2$, (3) polymer beads, (4) water, (5) optical brightener, (6) cyan dye and (7) surfactants. It may also contain an antiseptic. The following is a typical example: a mixture of 1,463 L distilled water and 163 g of dry gelatin was stirred in a large temperature controlled vessel until solution was achieved, and the pH was adjusted to pH 5.5. The two surfactants, 0.66 g of Dispex N40 and 0.54 g of tetrasodium pyrophosphate, and 0.54 g of the antiseptic, alcohol, were added and mixed with a standard bladed mixer. Five hundred ninety-five grams of dry titanium dioxide was added and mixed for five minutes. One hundred forty-four grams of Uvitex OB ™ dye (Ciba-Geigy, Ardsley, N.Y.) on polystyrene-divinylbenzene co-polymer as a 30% emulsion in water was added and mixed for five minutes. Two hundred ninety-seven grams of Ropaque ™ OP-84 acrylic copolymer emulsion was added and mixed for five minutes. Finally, 83 mg of Tint-ayd WD-2018 (a 2% emulsion of cyan magenta dye in propylene glycol-water) was added and the whole mixture was mixed for twenty minutes at 40° C. The resulting slurry containing agglomerates was passed through a four liter Netzsch media mill containing 1 mm zirconium silicate beads at 90% load. The mill was run at 2300 rpm shaft speed with a four minute residence time and was maintained at 40° C. FIG. 2 shows the smooth dispersion in the absence of any agglomerates. In fact, there are no particles larger than 1.0 μm. Other experiments run with 1 mm zirconium silicate spheres at 90% load and rpm's from 1000 to 2300 gave substantially similar results. From these experiments it has been determined that, at least for this formulation, the production of viable batches of dispersion is relatively insensitive to the speed of the rotor in the media mill.

Experiments using high speed shearing mixers of the rotor-stator type did not rid the white pad dispersion of the agglomerates. FIG. 1 shows the pad resulting from an experiment analogous to the foregoing, but using a Cowles rotor-stator high-shear mixer in place of the media mill.

While the invention has been particularly shown and described with reference to preferred embodiments thereof, it will be understood by those skilled in the art that other changes in form and details may be made therein without departing from the spirit and scope of the invention.

We claim:

1. A method for forming a dispersion for a titanium dioxide-based reflective binder comprising mixing water, titanium dioxide, gelatin and polymer beads to form an agglomerated mixture and passing said mixture through a media mill to form a uniform dispersion.

2. A method according to claim 1 further comprising mixing dyes, optical brighteners and surfactants.

3. A method according to claim 2 wherein said polymer beads are acrylic polymer beads and said surfactants are anionic surfactants.

4. A process for preparing a dispersion for a titanium dioxide-based reflective binder, comprising:

adding together dry titanium dioxide, dry gelatin, water, an aqueous anionic surfactant solution, an acrylic emulsion, an emulsion of a cyan dye and an emulsion of an optical brightener to form a mixture; and passing said mixture through a media mill to produce a homogeneous dispersion.

5. A process according to claim 4 further comprising adding an antiseptic.

6. A method for forming a reflective binder for a color photographic paper comprising:

(a) forming an agglomerated mixture comprising titanium dioxide, gelatin and polymer beads;

(b) passing said agglomerated mixture through a media mill to form a uniform dispersion; and (c) laying down a layer of said uniform dispersion on a base paper.

* * * * *